(12) United States Patent
Schmidt et al.

(10) Patent No.: US 6,238,639 B1
(45) Date of Patent: May 29, 2001

(54) PROCESS FOR REMOVING $NO_x$ FROM NITROSYLSULPHURIC ACID

(75) Inventors: Georg Schmidt, Frankfurt am Main; Egon Winkler, Schwalbach; Hartmut Wagner; Ronald Apel, both of Moers; Roland Fach, Schermbeck; Dieter Knoblich; Peter-Bernhard Stougie, both of Duisburg, all of (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/214,744

(22) PCT Filed: Jul. 16, 1996

(86) PCT No.: PCT/EP96/01719

§ 371 Date: May 14, 1999

§ 102(e) Date: May 14, 1999

(87) PCT Pub. No.: WO98/02381

PCT Pub. Date: Jan. 22, 1998

(30) Foreign Application Priority Data

May 4, 1995 (DE) .............................................. 195 16 303

(51) Int. Cl.⁷ .......................... C01B 21/093; C01B 17/90
(52) U.S. Cl. ............................................ 423/388; 423/531
(58) Field of Search ...................... 423/531, 388

(56) References Cited

U.S. PATENT DOCUMENTS

| | | |
|---|---|---|
| 4,155,989 | 5/1979 | Miller . |
| 5,433,767 | 7/1995 | Bresser et al. . |
| 5,603,748 | 2/1997 | Hirsch et al. . |

FOREIGN PATENT DOCUMENTS

| | | | |
|---|---|---|---|
| 1104690 | 2/1968 | (CA) . | |
| 1242194 | * 6/1967 | (DE) | ...................................... 423/388 |
| 2450255 | * 5/1976 | (DE) | ...................................... 423/531 |
| 196 08 530 A1 | 8/1997 | (DE) . | |
| 0 462 713 A1 | 5/1991 | (EP) . | |
| 1507947 | * 1/1967 | (FR) | ...................................... 423/531 |
| 348 866 | 6/1931 | (GB) . | |
| 31518 | * 8/1972 | (JP) | ...................................... 423/531 |
| 291407 | * 12/1986 | (JP) | ...................................... 423/531 |
| 1586996 | * 8/1990 | (RU) | ...................................... 423/531 |

OTHER PUBLICATIONS

Database WPI, Week 9115, Derwent Publications Ltd., London, GB; AN 108779, XP002027953, P.P. Kim et al., "Denitration of spent sulphuric acid." & SU 1 586 996 A (Gorki Poly) Aug. 23, 1990; & Chemical Abstracts, vol. 113, No. 26, Dec. 24, 1990, Columbus, Ohio, US; Abstract No. 234134; P.P. Kim et al., "Method o denitration of spent sulfuric acid".

* cited by examiner

Primary Examiner—Wayne Langel
(74) Attorney, Agent, or Firm—Norris McLaughlin & Marcus

(57) ABSTRACT

Nitrosylsulphuric acid is mixed in a mixing reactor with sulphuric acid saturated with $SO_2$. The acid mixture is led into a saturating reactor into the bottom region of which water and an $SO_2$-containing gas are introduced. The gas partially serves as stripping gas inside the saturating reactor. $SO_2$-saturated, $No_x$-free sulphuric acid with 5 to 60 wt % $H_2SO_4$ is removed from the bottom region of the saturating reactor and part thereof is mixed with nitrosylsulphuric acid in the mixing reactor.

6 Claims, No Drawings

PROCESS FOR REMOVING $NO_x$ FROM NITROSYLSULPHURIC ACID

This invention relates to a process of removing $NO_x$ from nitrosyl hydrogensulfate by mixing nitrosyl hydrogensulfate in a mixing reactor with sulfuric acid, which is saturated with $SO_2$, where a sulfuric acid containing $N_2O_3$ is withdrawn from the mixing reactor, and a stripping gas is passed through the withdrawn sulfuric acid.

Such process is known from GB-A-0,348,866. For the expulsion of residual nitrogen oxides from the sulfuric acid flue gas or an inert gas is passed through the sulfuric acid, with the temperature lying in the range from 100 to 200° C.

The object underlying the invention is to remove $NO_x$ from nitrosyl hydrogensulfate in a simple and inexpensive way. In accordance with the invention this is accomplished in the above-stated process in that the $N_2O_3$-containing sulfuric acid withdrawn from the mixing reactor is added to a saturation reactor, where in the lower portion of the saturation reactor an $SO_2$-containing gas is introduced at the same time, which at least in part flows upwards through the $N_2O_3$-containing sulfuric acid, that water is introduced into the saturation reactor, and from the saturation reactor a virtually $NO_x$-free sulfuric acid saturated with $SO_2$ is withdrawn, which has a $H_2SO_4$ concentration of 5 to 60 wt-%, and a partial stream of which is passed into the mixing reactor, where $SO_2$ is supplied to the mixing reactor in a stoichiometric surplus of at least 2 wt-% with reference to the $NO_x$ content of nitrosyl hydrogensulfate.

In accordance with the invention, the term $NO_x$ refers to a mixture of NO and $NO_2$. $NO_x$ is present in sulfuric acid as dissolved nitrosyl hydrogensulfate. Nitrosyl hydrogensulfate is formed from NO, which is contained in $SO_2$-containing gas. The $SO_2$-containing gas originates for instance from a roasting, sulfur combustion, sulfate separation or metallurgical process. NO is oxidized at the oxidation catalyst of a sulfuric acid plant for up to 50% to form $NO_2$. The mixture of NO and $NO_2$ is reacted with sulfuric acid to form nitrosyl hydrogensulfate as follows:

$$NO+NO_2+2H_2SO_4 \rightarrow 2HNOSO_4+H_2O$$

It is known that $SO_2$ reacts with nitrosyl hydrogensulfate by forming sulfuric acid and nitrogen oxides:

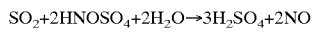

$$SO_2+2HNOSO_4+2H_2O \rightarrow 3H_2SO_4+2NO$$

In the production of sulfuric acid nitrosyl hydrogensulfate, usually with a $NO_x$ content of more than 2.5 wt-%, is separated as a condensate. The $NO_x$ content is present in the condensate as nitrosyl hydrogensulfate in addition to sulfuric acid.

In formal terms, nitrosyl hydrogensulfate can be reacted with $SO_2$ and water to form sulfuric acid and $N_2$. The redox reaction takes place between the dissolved $SO_2$ in the form of $SO_3^{2-}$ with the $N_2O_3$ in the form of $NO_2^-$, which was produced in the hydrolysis of nitrosyl hydrogensulfate. The reduction of the nitrogen oxides NO and $NO_2$ to nitrogen is effected in the hydrolysis of nitrosyl hydrogensulfate with dilute, $SO_2$-saturated sulfuric acid in that in the diluting solution the reducing agent is provided in the form of $SO_3^{2-}$ in an overstoichiometric amount, so that the equilibrium is shifted towards the formation of $N_2$.

It is an advantage of the present invention that the amount sulfuric acid present in a condensate containing nitrosyl hydrogensulfate can be recirculated to a sulfuric acid production without any $NO_x$. In accordance with the conventional processes the condensate is withdrawn from the process and must be subjected to a treatment or be disposed of. A particular advantage of the inventive process consists in that nitrogen is formed from the noxious substance $NO_x$ and is discharged together with the exhaust gas.

Preferably, $SO_2$ is supplied to the mixing reactor in a stoichiometric surplus of at least 5 wt-% with reference to the $NO_x$ content of nitrosyl hydrogensulfate. With this surplus of $SO_2$ a good result is achieved in the reduction of the $NO_x$ content. $SO_2$ is not lost as a result of the reduction of $NO_x$ to $N_2$, but is oxidized to form $SO_4^{2-}$. Excess $SO_2$ can be supplied to a plant for the production of sulfuric acid, so that an extensive treatment is not necessary.

Advantageously, the sulfuric acid concentration after the addition of $SO_2$ is 5 to 30 wt-%. In this range of the sulfuric acid concentration particularly good results are achieved for the reduction of $NO_x$ to $N_2$.

In accordance with an advantageous aspect of the invention gaseous $SO_2$ is brought into aqueous solution in a saturation reactor designed as packed column, and is combined with the $NO_x$-containing sulfuric acid as an aqueous solution. The $SO_2$ saturation is promoted by operating the saturator under an increased gas pressure.

In accordance with the invention, the $NO_x$ content of a $NO_x$-containing sulfuric acid (nitrosyl hydrogensulfate) or a $NO_x$-containing sulfuric acid mixture is reduced. The process in accordance with the invention can advantageously not only be applied to $NO_x$-containing sulfuric acid, but with very good results also to mixtures containing $NO_x$ and sulfuric acid, such as nitrating acid or sulfuric acid contaminated with other compounds.

Embodiments of the invention will be explained in detail with reference to the drawing and examples. The drawing represents a flow diagram of the process.

The most important parts of the process are the reactor (X) for the saturation of $SO_2$ and the mixing reactor (Y) for hydrolysis and redox reaction of nitrosyl hydrogensulfate with $SO_2$-containing dilute sulfuric acid. $SO_2$-containing roaster gas is introduced via line (1), and water is introduced via line (4) into the lower portion of the saturation reactor (X). Via line (3) nitrosyl hydrogensulfate or condensate containing said acid is supplied to the mixing reactor (Y). In principle, dilute sulfuric acid is circulated between the reactors (X) and (Y) via lines (5), (6), (6A), (7) and (8). Sulfuric acid formed is withdrawn via line (6B), and $N_2$ is discharged together with the exhaust gas via line (2).

Via line (5), sulfuric acid is withdrawn from the saturation reactor (X) and passed through a pump (9). Said sulfuric acid is saturated with $SO_2$, is virtually $NO_x$-free, and has a $H_2SO_4$ concentration of 5 to 60 wt-% and mostly not more than 35 wt-%. From the pump (9), the sulfuric acid is withdrawn via line (6). A partial stream of the acid is supplied to the mixing reactor (Y) via line (6A). The acid withdrawn from the reactor (Y) via line (7), which still contains $N_2O_3$, is supplied to the indirect cooler (W). Via line (10), the cooler is supplied with cooling water, which is withdrawn via line (11).

Cooled sulfuric acid is introduced into the saturation reactor (X) via line (8). The reactor (X) contains at least one packed bed. In the reactor (X) upwardly flowing $SO_2$-containing gas serves as stripping gas for removing residual nitrogen oxides from the sulfuric acid supplied via line (8).

EXAMPLE 1

In an arrangement as shown in the drawing the procedure is as follows:

Via line (3), 240 kg/h condensate with a nitrosyl hydrogen-sulfate content of 9.5% $HNOSO_4$ corresponding to 6.8 kg/h $N_2O_3$ are introduced into the mixing reactor (Y). The condensate comes from a sulfuric acid production. Via line (6A) an $SO_2$-saturated sulfuric acid with 20 wt-% $H_2SO_4$ is supplied to the reactor (Y), the condensate and $SO_2$-saturated sulfuric acid are mixed. The dissolved $SO_2$ reacts with nitrosyl hydrogensulfate to form sulfuric acid and nitrogen. The mixture is withdrawn via line (7), and behind the block cooler (W) still has a content of 465 mg $N_2O_3$/l, which corresponds to a content of 2.0 kg $N_2O_3$/h. In the saturation reactor (X) the circulating sulfuric acid is saturated with $SO_2$, where $SO_2$-containing roaster gas, which contains 0.28 g/h $NO_x$, is supplied via line (1). The concentration of sulfuric acid is adjusted to 20 wt-% $H_2SO_4$ by means of a controlled addition of water through line (4). The roaster gas leaving the reactor (X) via line (2) has a reduced $SO_2$ content and is returned to the sulfuric acid production as a wet gas. The gas in line (2) contains 3.125 mg $NO_x/Nm^3$ corresponding to 2.0 kg $N_2O_3$ per hour. In the sulfuric acid in lines (6B) and (6A) $NO_x$ could no longer be detected. The denitrating conversion was 71.75%.

EXAMPLE 2

Example 2 is carried out like Example 1, but with the following differences:

$SO_2$-saturated sulfuric acid containing 16 wt-% $H_2SO_4$ is supplied to the mixing reactor (Y) via line (6A). Behind the block cooler (W) the sulfuric acid in line (8) contains 400 mg $N_2O_3$/l corresponding to 1.7 kg $N_2O_3$/h. After a controlled addition of water through line (4), a sulfuric acid with a concentration of 16 wt-% $H_2SO_4$ is produced in the saturation reactor (X) and withdrawn via line (5). This sulfuric acid is $NO_x$-free. The denitrating conversion was 80.23%.

EXAMPLE 3

The procedure is as in Examples 1 and 2, but with the following differences:

Via line (3) 190 kg/h condensate are introduced into the mixing reactor (Y). The condensate has a nitrosyl hydrogensulfate content of 7.5 wt-% $HNOSO_4$ corresponding to 4.3 kg $N_2O_3$ per hour. The condensate is mixed in the mixing reactor (Y) with a 33%, $SO_2$-saturated sulfuric acid from line (6A). Behind the block cooler (W), the sulfuric acid in line (8) contains 350 mg $N_2O_3$/l corresponding to 1.5 kg $N_2O_3$/h. In the saturation reactor (X) a sulfuric acid with a concentration of 33 wt-% $H_2SO_4$ is adjusted through a controlled addition of water and withdrawn through line (5). The acid is $NO_x$-free. The $SO_2$ gas withdrawn via line (2) contains 4700 mg $NO_x/Nm^3$ corresponding to 3.0 kg $N_2O_3$/h. The denitrating conversion is 34.5%.

The comparison of Examples 1, 2 and 3 clearly illustrates that there is a dependence between the $NO_x$ conversion and the concentration of the circulating sulfuric acid. The higher the concentration of the circulating sulfuric acid, the lower the denitrating conversion.

The advantage of a rather high denitrating conversion consists in the fact that the circulating amount of $NO_x$ is lower. $NO_x$ which is not discharged from the denitrating plant gets back to the main gas stream of the sulfuric acid plant, where nitrosyl hydrogensulfate is formed again. A lower denitrating conversion requires a larger denitrating plant.

What is claimed is:

1. A process of removing $NO_x$ from nitrosyl hydrogensulfate by mixing nitrosyl hydrogensulfate in a mixing reactor with sulfuric acid, which is saturated with $SO_2$, where a $N_2O_3$-containing sulfuric acid is withdrawn from the mixing reactor, and a stripping gas is passed through the withdrawn sulfuric acid, wherein the $N_2O_3$-containing sulfuric acid withdrawn from the mixing reactor is added to a saturation reactor, where in the lower portion of the saturation reactor a $SO_2$-containing gas is introduced at the same time, which at least partly flows upwards through the $N_2O_3$-containing sulfuric acid, that water is introduced into the saturation reactor, and from the saturation reactor an $SO_2$-saturated, virtually $NO_x$-free sulfuric acid with a $H_2SO_4$ concentration of 5 to 60 wt-% is withdrawn, a partial stream of which is introduced into the mixing reactor, where $SO_2$ in a stoichiometric surplus of at least 2 wt-% with reference to the $NO_x$ content of nitrosyl hydrogensulfate is supplied to the mixing reactor.

2. The process as claimed in claim 1, wherein the sulfuric acid withdrawn from the mixing reactor is cooled before being introduced into the saturation reactor.

3. The process as claimed in claim 2, wherein the sulfuric acid withdrawn from the mixing reactor is indirectly cooled with cooling water, where heated cooling water is withdrawn from the indirect cooling system.

4. The process as claimed in claim 1 wherein $SO_2$ in a stoichiometric surplus of at least 5 wt-% with reference to the $NO_x$ content of nitrosyl hydrogensulfate is supplied to the mixing reactor through the partial stream of $SO_2$-saturated sulfuric acid.

5. The process as claimed in claim 1 wherein $SO_2$-saturated sulfuric acid with a $H_2SO_4$ content of 5 to 35 wt-% is withdrawn from the saturation reactor.

6. The process as claimed in claim 1, wherein the nitrosyl hydrogensulfate is obtained from a plant for producing sulfuric acid from $SO_2$-containing roaster gas, and $SO_2$-containing roaster gas is introduced into the lower portion of the saturation reactor.

* * * * *

UNITED STATES PATENT AND TRADEMARK OFFICE
CERTIFICATE OF CORRECTION

PATENT NO.    : 6,238,639 B1
DATED         : May 29, 2001
INVENTOR(S)   : Georg Schmidt et al.

It is certified that error appears in the above-identified patent and that said Letters Patent is hereby corrected as shown below:

<u>Title page,</u>
Item [75], Inventors, change the 2nd inventor's place of residence from "Schwalbach, Germany" to -- Florsheim/Main, Germany --

Signed and Sealed this

First Day of April, 2003

JAMES E. ROGAN
*Director of the United States Patent and Trademark Office*